United States Patent [19]
Lee et al.

[11] Patent Number: 5,740,761
[45] Date of Patent: Apr. 21, 1998

[54] ANIMAL LITTER COMPOSITION AND METHOD OF MAKING SAME

[76] Inventors: Bosco H. Lee; Yvonne Huiyi Lee, both of 574 Williams St., Oakland, Calif. 94612

[21] Appl. No.: 787,348

[22] Filed: Jan. 27, 1997

Related U.S. Application Data

[63] Continuation-in-part of Ser. No. 502,396, Jul. 14, 1995, abandoned.

[51] Int. Cl.⁶ .................................................. A01K 29/00
[52] U.S. Cl. ............................................................ 119/173
[58] Field of Search ................................. 119/171, 172, 119/173

[56] References Cited

U.S. PATENT DOCUMENTS

| | | |
|---|---|---|
| 3,451,944 | 6/1969 | Finch . |
| 5,229,348 | 7/1993 | Ivie ................................. 119/173 X |
| 5,329,867 | 7/1994 | Sugita . |
| 5,638,770 | 6/1997 | Peleties ................................. 119/173 |

*Primary Examiner*—Thomas Price
*Attorney, Agent, or Firm*—Keiichi Nishimura

[57] ABSTRACT

Animal litter compositions which are highly carbonaceous and contain activated charcoal by 50 weight % are produced by pyrolyzing fibrous agricultural products such as rice hulls.

20 Claims, No Drawings

5,740,761

ANIMAL LITTER COMPOSITION AND METHOD OF MAKING SAME

This is a continuation-in-part of application Ser. No. 08/502,396 filed Jul. 14, 1995, to be abandoned.

BACKGROUND OF THE INVENTION

This invention relates to animal litters such as cat litters and, more particularly, to biodegradable pyrolyzed agricultural products which can serve in such animal litters. The invention also relates to a method of making such an animal litter composition.

Many kinds of animal litters have been available for household pets. Fuller's earth, which has been widely used as a cat litter, however, is not sufficiently absorbent and its deodorizing capability is limited. It has also been known to use a deodorizer to mask the odor and a binder to hold the litter material in a granular form. If the odor of the deodorizer does not appeal to the cat, however, the cat may be forced to deposit its waste elsewhere in the house. The smells of some deodorizers are repugnant not only to the cat but also to its owner.

Some cat litters are made "scoopable" such that a wetted portion of the litter can be easily separated from unwetted portions and the remaining litter material can be refilled to the normal level. This type of litter normally comprises a hydrophilic substance because a hydrophilic material reacts with moisture in the waste matter and produces clumps of litter which may be scooped up and discarded. Some litter substances may stick to the bottom of the container. Since these litters do not absorb aqueous wastes readily, the wastes may go to the bottom of the litter box before they are absorbed by the litter material.

Some litters have been said to be flushable in toilets, but flushable litters are usually clumpable. When clumped animal wastes are flushed in a toilet, however, the litter material may expand and clog the toilet. Even ground corncob litter expands, and the user is usually advised to flush only in small quantities. Litters made of wood saw-dust are not much better. Paper-based litters may flush somewhat better, but they do not form clumps readily for easy handling.

Another disadvantage of prior art scoopable litters is that they are usually heavy. Still another disadvantage is that a cat, walking away from the litter box, often leaves prints on the floor especially if the litter contains an adhesive substance for improving its clumping ability. A further problem with prior art litters is that, although some are biodegradable and hence environmentally friendly, such litters are more expensive than ordinary clay or sand litters.

SUMMARY OF THE INVENTION

It is therefore a general object of this invention to provide an improved animal litter which is flushable in toilets, ready to form clumps to be scoopable, biodegradable, inexpensive to produce, light in weight and capable of improved odor control.

It is another object of this invention to provide a method of producing such an animal litter.

Animal litter compositions embodying this invention, with which the above and other objects can be accomplished, are characterized as being obtained by pyrolyzing fibrous agricultural products and in a highly carbonaceous form, containing activated charcoal by 50 weight % or more.

DETAILED DESCRIPTION OF THE INVENTION

Animal litter compositions according to this invention are produced by pyrolyzing fibrous natural agricultural products and are in a highly (that is over 90 weight %) carbonaceous form, containing activated charcoal by 50 weight % or more, say, up to 90 weight %. Examples of fibrous natural agricultural products, which may be pyrolyzed according to this invention, include rice hulls, wheat husks and stalks, peanut hulls, straw and corn cobs and stalks, but rice hulls are particularly preferred.

As an example, raw rice hulls may be put in a container with a removable lid at the top and a set of cooling pipes for temperature control at a lower portion. Rice hulls are then subjected to a flameless burning process to be pyrolized by limiting the air supply. Since the fire point of rice hulls is 410 degrees C., the temperature inside the container is kept below this level, or preferably in the range of 370-380 degrees C.

The purpose of the pyrolytic process according to this invention is to remove the volatile components to produce a porous carbon skeleton. The volatile components are slowly burnt off. The carbon dioxide produced as a result of the combustion of rice hulls creates a blanket on the surface of the mass of the rice hulls. This blanket of carbon dioxide serves to sufficiently deprive the self-burning rice hulls of oxygen, which would be required for flaming. When the rice hulls are mostly charcoalized, presenting a charred appearance, and reduced to about 65% of the original volume, the lid at the top is closed such that the combustion stops for lack of oxygen. The ambient temperature is kept under 410 degrees C. and the container is kept undisturbed throughout this process except for controlling temperature through the cooling pipes or by adjusting side walls of the container. This may take several days. The highly carbonaceous rice hulls thus produced are then cooled off. Since the typical composition of rice hulls on a dry basis is 37.7 to 42.1% carbon and 15.0 to 20.3% ash, the processed rice hulls have a reduced weight of about 55% of the original material and a reduced volume of about 65%.

Raw rice hulls typically contain a high percentage of siliceous material. If the temperature of the rice hulls is raised to over 410 degrees C. with a sufficient air supply, they will self-burn to reach a temperature over 800 degrees C. If the rice hulls are allowed to burn under such a condition, say, for two hours, they will turn into white ash containing about 90% of $SiO_2$, which is a hazardous substance for both a pet and its owner.

Animal litter compositions embodying this invention have many advantages. Firstly, they make use of agricultural by-products (rather than what may be referred to as agricultural products) as raw material, and they are themselves biodegradable and environmentally friendly. They can be used, for example, as compost to improve soil condition. As the slow flameless combustion requires no continuous heat source, energy consumption for the production is minimal. This means, in turn, that the compositions according to this invention can be produced at low costs.

Secondly, animal litter compositions of this invention contain at least 50% of activated charcoal, and this makes them very effective in the adsorption of odor and absorption of liquids pertaining to animal wastes. Cat litters using animal litter compositions according to this invention last generally about three times longer than prior art cat litters using clay. Tests show that pyrolyzed rice hulls are most effective with feces. As soon as the litter comes into contact with feces, the moisture and odor are absorbed immediately and a film crust is formed on the surface to make it free of odor and easy to scoop up. In summary, compositions according to this invention are capable of improved odor control both in liquid and in the immediate environment of the litter box due to the activated charcoal contained therein.

Thirdly, compositions according to this invention are light in weight, in the range of 0.85-1.4g/cc. They are certainly much lighter than ordinary clay products or Fuller's Earth compositions. Many cat owners are seniors and/or physically handicapped. Light-weight cat litters are definitely attractive to such cat owners. Particle size of the compositions may be, according to the Tyler Standard Screen Scale, between Tyler Sieve Nos. 12–70, and more preferably between Tyler Sieve Nos. 16–50.

Still another advantage is that animal litter compositions of this invention can be flushed into the toilet without causing any plumbing problems. Once in contact with water, they break up into small particles, allowing them to be flushed away.

It now goes without saying that animal litter compositions of this invention may be used as a mixture with prior art animal litter compositions such as Fuller's earth although some of the favorable characteristics described above may not be fully exploited.

What is claimed is:

1. An animal litter composition consisting essentially of fibrous agricultural products which are pyrolyzed, said composition containing activated charcoal by greater than 50% and up to 90 weight %.

2. The animal litter composition of claim 1, over 90 weight % of which is in carbonaceous form.

3. The animal litter composition of claim 2 wherein said agricultural products are selected from the group consisting of rice hulls, wheat husks and stalks, peanut hulls, straw and corn cobs and stalks.

4. The animal litter composition of claim 2 which is mixed with another animal litter composition.

5. The animal litter composition of claim 4 wherein said another animal litter includes Fuller's earth.

6. The animal litter composition of claim 1 wherein said agricultural products are selected from the group consisting of rice hulls, wheat husks and stalks, peanut hulls, straw and corn cobs and stalks.

7. The animal litter composition of claim 1 which is mixed with another animal litter composition.

8. The animal litter composition of claim 7 wherein said another animal litter includes Fuller's earth.

9. The animal litter composition of claim 1 with density between 0.85 and 1.4 g/cc.

10. The animal litter composition of claim 1 with particle size between Tyler Sieve Nos. 12 and 70.

11. The animal litter composition of claim 10 with particle size between Tyler Sieve Nos. 16 and 50.

12. A method of producing an animal litter composition comprising the step of pyrolyzing fibrous natural agricultural products until the content therein of activated charcoal exceeds 50 weight %.

13. The method of claim 12 wherein said fibrous natural agricultural products are pyrolyzed until over 90 weight % of agricultural products is in carbonaceous form.

14. The method of claim 13 wherein said agricultural products are selected from the group consisting of rice hulls, wheat husks and stalks, peanut hulls, straw and corn cobs and stalks.

15. The method of claim 12 wherein said agricultural products are selected from the group consisting of rice hulls, wheat husks and stalks, peanut hulls, straw and corn cobs and stalks.

16. The method of claim 12 wherein said agricultural products are subjected to a flameless combustion process inside a container with a removable lid, said method including the step of closing said lid to stop said combustion process.

17. The method of claim 16 wherein said agricultural products comprise rice hulls and said pyrolyzing step is carried out at temperatures below 410 degrees C.

18. The method of claim 17 wherein said pyrolyzing step is carried out at temperatures at 370–380 degrees C.

19. The method of claim 12 further comprising the step of adding another kind of animal litter composition to make a mixture.

20. The method of claim 19 wherein said another kind of animal litter comprises Fuller's earth.

* * * * *